L. Huntoon,
Steam-Engine Piston.

Nº 56,420.   Patented July 17, 1866.

Witnesses:
Samuel N. Piper
George Andrews

Inventor:
L. Huntoon,
by his attorney.
R. H. Eddy

UNITED STATES PATENT OFFICE.

LAFAYETTE HUNTOON, OF MILFORD, MASSACHUSETTS.

IMPROVEMENT IN PISTONS.

Specification forming part of Letters Patent No. 56,420, dated July 17, 1866.

*To all whom it may concern:*

Be it known that I, LAFAYETTE HUNTOON, of Milford, in the county of Worcester and State of Massachusetts, have invented a new and useful Improvement in Pistons for Steam or various other Engines; and I do hereby declare the same to be fully described in the following specification, and represented in the accompanying drawings, of which—

Figure 3:
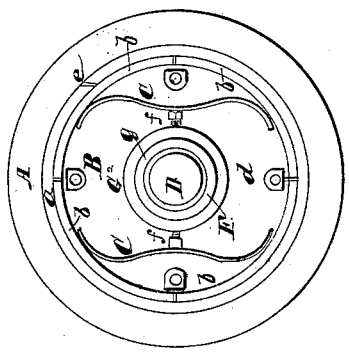
Figure 2:
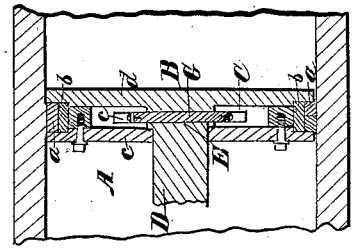
Figure 1:
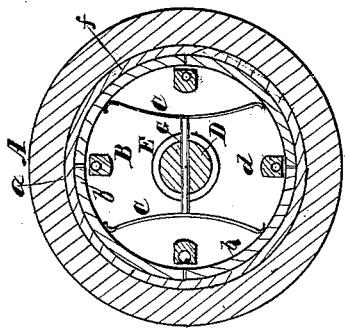

Figure 1 is a horizontal section, and Fig. 2 a transverse section, of a piston-head provided with my improvement. Fig. 3 exhibits another mode in which I have contemplated the application or construction of my invention.

In such drawings, A may be supposed to be the cylinder, and B the piston-head, of a steam-engine, such piston-head being what is termed an "expansion" one—that is, one having a chamber within it arranged between two heads or disks, $c\ d$, and within two series of expansive and concentric rings or sections of rings, $a\ b$, arranged as represented.

My improvement has reference to the application of the springs to the series of rings, whereby such springs are caused to operate with an equal pressure on the rings, in order to cause them to bear equally on the surface of the cylinder.

The inner circle or ring is composed of sections $b\ b\ b$, the outer or circumscribing ring being a whole annulus, except in being split, as shown at $e$.

The two springs and their arrangement are exhibited at C C. Each spring is a bow-spring. They are disposed on opposite sides of the hub E of the piston-head, such hub being to receive and hold the piston-rod D. Furthermore, the two springs are connected by a bar, G, which, as shown in Figs. 1 and 2, goes through the hub E, and should be capable of freely sliding lengthwise therein. In Fig. 3 the two springs are represented as connected at their middles, by screws $f f$, to a ring, $G^2$, which circumscribes the hub E, and has an internal diameter somewhat greater than the extreme diameter of the hub, there being an annular space, $g$, between the hub and the ring. By thus connecting the springs—that is, by a device which is free to move in a direction toward either of them—the pressure of either spring on the expansion-rings will be equal to that of the other, for in case one spring may be stiffer than the other the excess, by means of their connection, will be divided between the two, so as to cause them to bear equally on the rings.

As it is very difficult to make two springs of equal elasticity, were it not for connecting them as described we should be liable to have the rings pressed in one direction more than in the other or opposite, the result being unequal wear of the cylinder and outer rings, and, as a consequence, more or less leakage of steam by the piston.

The ring $G^2$ (shown in Fig. 3) saves the necessity of a passage being made through the hub E.

I do not claim an expansion-piston having rings to be expanded by springs; nor do I claim the employment of a single ring-spring with wedges to operate with sections of rings, as in the well-known piston invented by J. Barton, my invention having reference to the employment of two separate springs.

What I claim as my improvement is—

The combination of the separate springs C C with a connection, G, or its equivalent, substantially as described, whereby half of the excess of pressure of one spring may be transferred to the other, so as to equalize the pressure of both on the rings, as specified.

LAFAYETTE HUNTOON.

Witnesses:
R. H. EDDY,
SAMUEL N. PIPER.